United States Patent [19]

Rumpler

[11] Patent Number: 4,897,001

[45] Date of Patent: Jan. 30, 1990

[54] DE-STAKING TOOL AND METHOD FOR REMOVAL OF HEAD GIMBALS FROM HEAD STACK ASSEMBLIES

[75] Inventor: Allen G. Rumpler, San Diego, Calif.

[73] Assignee: Computer & Communications Technology Corp., San Diego, Calif.

[21] Appl. No.: 160,147

[22] Filed: Feb. 25, 1988

[51] Int. Cl.$^4$ .............................................. B23B 51/00
[52] U.S. Cl. .................................... 408/212; 408/227; 408/211
[58] Field of Search .................. 408/84, 211, 212, 227

[56] References Cited

U.S. PATENT DOCUMENTS

| 39,608 | 8/1863 | Williams | 408/84 |
|---|---|---|---|
| 606,985 | 7/1898 | Wrege | 408/84 |
| 2,360,942 | 10/1944 | Ellerstein | 408/84 |
| 3,907,452 | 9/1975 | Tripp | 408/84 |

Primary Examiner—Rodney B. Bovernick
Assistant Examiner—J. Ryan
Attorney, Agent, or Firm—Spensley Horn Jubas & Lubitz

[57] ABSTRACT

An apparatus and method for removing a head gimbal from a head stack assembly without causing damage to adjacent head gimbals and minimizing damage to the head stack assembly. The tool driver of a miniature drill is inserted through holes in the stack assembly and attached head gimbals to the position of the head gimbal to be removed. A removable cutting tool is attached to the tool driver and the head gimbal is drilled free of the head stack assembly.

2 Claims, 2 Drawing Sheets 4,897,001

DE-STAKING TOOL AND METHOD FOR REMOVAL OF HEAD GIMBALS FROM HEAD STACK ASSEMBLIES

BACKGROUND OF INVENTION

1. Field of invention

This invention involves an apparatus and method for removing a ball staked head gimbal from a head stack assembly.

2. Description of Related Art

In computer disk drives, magnetic heads for reading rotating magnetic disks are mounted on relatively delicate structures known as "head gimbals". A plurality of head gimbals are typically firmly mounted on a structure known as a "head stack assembly". A common type of head stack assembly is an "E" block, which refers to the general shape of the head assembly. FIG. 1 depicts a typical "E" block head stack assembly 1 and a number of attached head gimbals 2. Each head gimbal 2 includes a staking plate 2a and a flexure 2b. A disk read/write head 3 is affixed to the end of each flexure 2b. These disk heads 3 read data from, or write data to, the rotating computer disk 4.

A hollow, cylindrical staking hub 5 extends from the lower surface of each staking plate 2a. A corresponding staking hole 6 is located in each arm of the "E" block 1. The staking hub 5 of a head gimbal fits into the staking hole 6 located in the arm of an "E" block. A staking tool is then inserted into the hole of the staking hub and the hub is expanded to create a very tight friction fit against the sides of the staking hole 6. Generally, head stack assemblies contain four to sixteen head gimbals which are staked, or swaged, in line and spaced approximately 0.150 to 0.200 inches apart.

In order to replace a defective head gimbal from any position in a head stack assembly, a removal tool must be used. Prior methods include a series of tools which force rotation of the head gimbal to approximately 45° from its true position. Once the gimbal is rotated, the corners of the gimbal are exposed and can be pried upward or downward to remove the gimbal from the stack assembly. This method of removal creates considerable stress on the stack assembly 1 and can distort the staking hole 6. Using this method of removing head gimbals, rework can typically only be done twice in any one position due to the damage caused by the removal procedure.

Therefore, it is an object of this invention to provide an apparatus and method for removing a ball staked head gimbal while minimizing damage to the head stack assembly.

SUMMARY OF THE INVENTION

This invention involves an apparatus and method for removing a defective head gimbal from a head stack assembly without damage to other head gimbals in the stack or to the head stack assembly. The tool driver of a miniature drill is inserted through holes in the stack assembly and head gimbals. A cutting tool is positioned at the location of the head gimbal to be removed. The tool driver is then inserted in the cutting tool. This invention allows the operator to selectively drill out the staking hub of a head gimbal without disturbing other head gimbals in the stack while minimizing stress, distortion, or damage to the staking hole or stack assembly.

Custom fixtures for each model of stack assembly can be designed which will position and protect the stacks during the removal process. The size and configuration of the cutting tool and tool driver are designed to enable the defective parts to be drilled out of any head gimbal position without damage to any part of the assembly.

These and other features and advantages of the invention will become more apparent upon consideration of the accompanying drawings and detailed description.

BRIEF DESCRIPTION OF THE DRAWINGS

Like reference numbers in the various drawings refer to like elements.

DETAILED DESCRIPTION OF THE INVENTION

Figure 2:
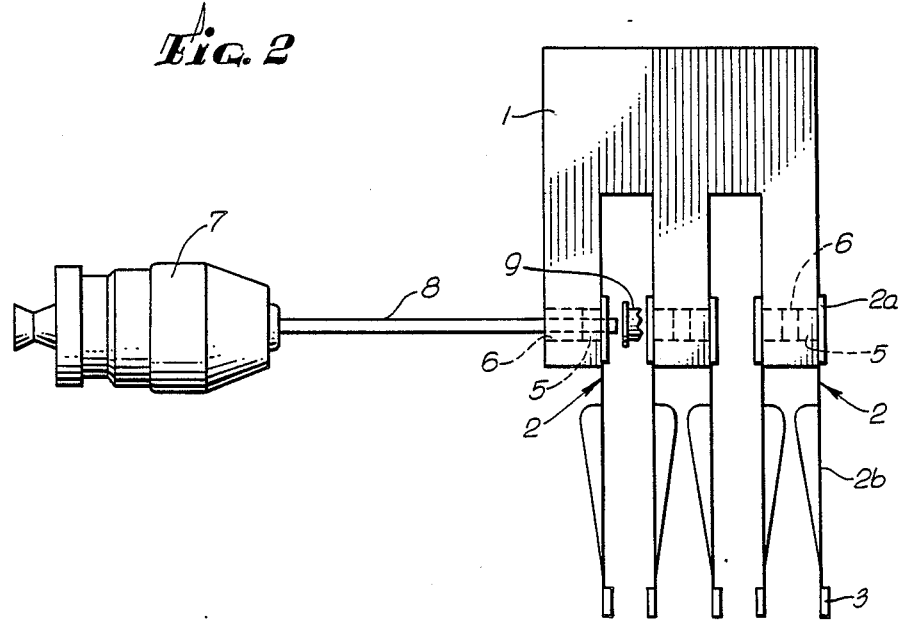
FIG. 2 is a planar view of a de-staking tool for removal of head gimbals from "E" stack assemblies.

FIG. 2 depicts an apparatus for removing head gimbals from a head stack assembly 1, and particularly from an "E" block head assembly, while minimizing damage to the head stack assembly. The apparatus includes a drill chuck and spindle 7 of conventional design, a tool driver 8, and a readily removable cutting tool 9.

Figure 1:
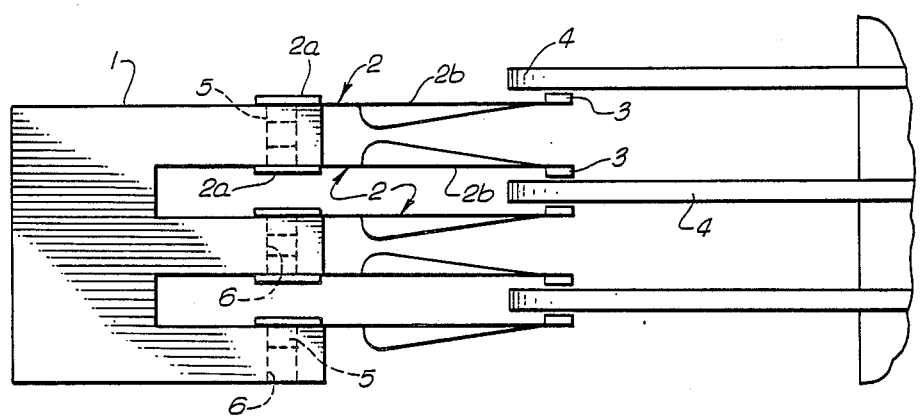
FIG. 1 is a planar view of a typical "E" block head assembly with attached head gimbals, showing some of the hidden components in broken lines.

Shown attached to the illustrated "E" block head stack assembly 1 are five head gimbals 2, each mounted to the head stack assembly 1 by ball staking of its staking hub 5 into a corresponding staking hole 6, as described above with respect to FIG. 1.

The diameter of the tool driver 8 is slightly smaller than the axial hole in a staking hub 5, so that the tool driver 8 can be inserted through the holes in the staking hubs 5 and the staking holes 6 of the "E" block 1 to the position of a head gimbal 2 to be removed. The cutting tool 9 is inserted between the "arms" of the "E" block 1 at the location of the head gimbal to be removed. This may be accomplished by means of a guide bar 10, specifically designed to loosely hold a cutting tool 9, or manually with tweezers or a similar instrument in instances of low volume production. The tool driver 8 is then inserted in or attached to the cutting tool 9 by any means which allows the cutting tool 9 to be readily removed, such as a friction fit or compression ball.

With the cutting tool 9 in place, the drill is activated and the staking hub 5 of the selected head gimbal 2 is drilled out. The tool driver 8 is then retracted, and the cutting tool 9 is removed from the tool driver 8. The selected head gimbal 2 may then be removed without damaging the remaining head gimbals.

Figure 3:
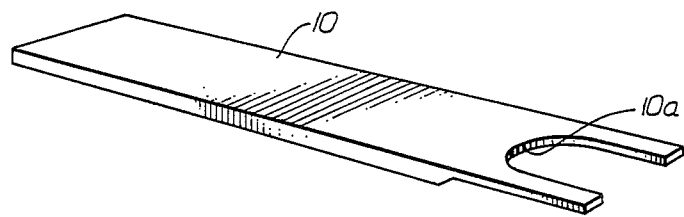
FIG. 3 is a perspective view of a guide bar used to position the cutting tool of the de-staking tool.

FIG. 3 illustrates an example of a guide bar 10, which may be used to place the cutting tool 9 in the proper location between the head gimbals 2. The cutting tool 9 sits loosely in a hole 10a at the end of the guide bar 10. Once the cutting tool 9 is placed in the proper position and attached to the tool driver 8, the guide bar 10 may be removed.

In the illustrated embodiment, the cutting tool 9 is approximately 0.13 inches long. It is custom made for each type of head gimbal 2 and head assembly 1 so that the diameter of the cutting tool 9 is approximately the same as the diameter of the staking hub 5 of the head gimbal 2, and slightly smaller than the staking hole 6 in the "E" block 1. This design insures that when the drill is activated, the cutting tool 9 does not cause significant damage to the staking hole 6 of the head assembly 1 during the removal of a head gimbal 2.

Figure 4:
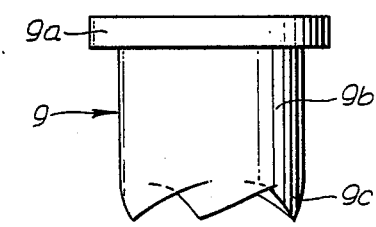
FIG. 4 is a side view of the cutting tool of the de-staking tool.

FIG. 4 shows a side view of the cutting tool 9. A crown 9a at the top of the cutting tool 9 stops the cutting barrel 9b at the proper depth. The barrel 9b is milled to create cutting edges 9c, and may be made of any hard cutting tool material, such as high speed tool steel or silicon carbide.

Figure 5:
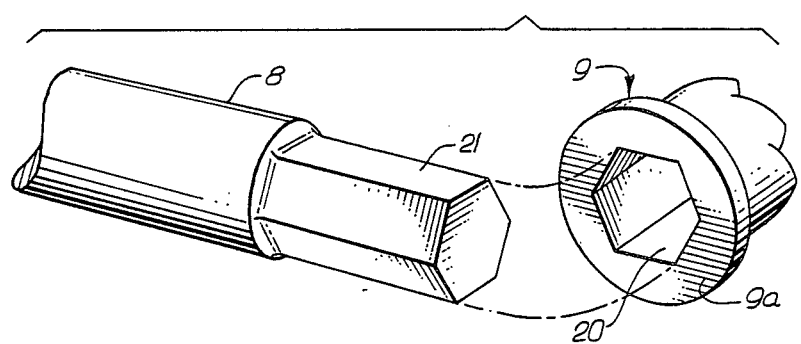
FIG. 5 is a perspective view of the tool driver and cutting tool of the de-staking tool.

FIG. 5 demonstrates one way of configuring the tool driver 8 and the crown 9a of the cutting tool 9 for a friction fit method of attachment. The example shown uses a hexagonal hole 20 within the crown 9a, which mates with the hexagonal shaped tip 21 of the tool driver 8 for driving purposes. However, other configurations for driving may be used as well, such as a "D" shaped hole and mating tool driver tip.

This invention has been described with references to certain presently preferred embodiments. Various modifications of the preferred embodiments, as well as other embodiments of the invention, will be apparent to persons skilled in the art upon reference to this description. For example, it may be desirable to have a jig or fixture custom designed for each type of head stack assembly. The fixture would hold a head stack assembly stable and properly aligned (i.e. with the axes of the head gimbal staking hubs 5 in alignment with the tool driver 8), for increased accuracy in drilling. It is therefore contemplated that the appended claims will cover any modifications or embodiments that fall within the true scope of the invention.

I claim:

1. A method for removing a ball-staked head gimbal from a head stack assembly without damaging or disturbing adjacent head gimbals and minimizing damage to the head stack assembly, comprising the steps of:

(a) providing a drill having a tool driver which fits through the staking hub of a head gimbal;
   (b) inserting the tool driver through the staking hubs and the staking holes of the head stack assembly so that the tip of the tool driver is adjacent the staking hub of a selected head gimbal that is to be removed;
   (c) positioning a cutting tool between the head gimbals at the location of the selected head gimbal to be removed;
   (d) attaching the cutting tool to the tool driver;
   (e) activating the drill to drill out the staking hub from the selected head gimbal so that the head gimbal is no longer affixed to the head stack assembly.

2. An apparatus for removing an interiorly mounted ball-staked head gimbal from a head stack assembly having a plurality of in-line head gimbals, each gimbal being of the type that has a tubular staking tub, comprising:

(a) a drill having a tool driver having a diameter less than the inside diameter of the tubular staking hubs, the tool driver being inserted through the tubular staking hubs to a selected interiorly mounted head gimbal to be removed from the head stack assembly;
   (b) a cutting tool removably attachable to the tool driver and sized to fit between a pair of head gimbals, the cutting tool having a cutting face substantially the same diameter as the outside diameter of the tubular staking hubs; and
   (c) means for positioning the cutting tool at the location of the selected head gimbal, wherein the cutting tool is there removably attached to the tool driver such that rotation of the tool driver rotates the cutting tool whereby the cutting action of the cutting tool removes the hub of the selected head gimbal thereby removing the selected head gimbal from the head stack assembly.

* * * * *